(12) United States Patent
Chang (10) Patent No.: US 8,843,308 B2
(45) Date of Patent: Sep. 23, 2014

(54) SYSTEM AND METHOD FOR EXPRESSING MAP ACCORDING TO CHANGE SEASON AND TOPOGRAPHY

(71) Applicant: Thinkware Systems Corporation, Seoul (KR)

(72) Inventor: Sang Hun Chang, Seoul (KR)

(73) Assignee: Thinkware Systems Corporation (KR)

( * ) Notice: Subject to any disclaimer, the term of this patent is extended or adjusted under 35 U.S.C. 154(b) by 0 days.

(21) Appl. No.: 13/683,298

(22) Filed: Nov. 21, 2012

(65) Prior Publication Data

US 2013/0096830 A1    Apr. 18, 2013

Related U.S. Application Data

(63) Continuation of application No. 12/226,721, filed as application No. PCT/KR2007/000965 on Feb. 26, 2007, now abandoned.

(30) Foreign Application Priority Data

Apr. 27, 2006  (KR) .................. 10-2006-0038042

(51) Int. Cl.
*G01C 21/00*   (2006.01)

(52) U.S. Cl.
USPC ........... 701/429; 701/428; 701/430; 701/454; 701/532; 715/273; 715/275

(58) Field of Classification Search
CPC . G05D 1/0246; G05D 1/0251; G05D 1/0274; G06T 11/00; G06T 11/001; G06T 11/20; G06T 11/203; G06T 11/206; G06T 11/40
USPC ........... 701/211, 200, 28, 428, 429, 430, 431, 701/432, 436, 454, 532; 382/274, 162, 165; 715/273, 275; 353/11, 12; 358/448, 358/452

See application file for complete search history.

(56) References Cited

U.S. PATENT DOCUMENTS 5,908,465 A *  6/1999  Ito et al. .................. 701/532
6,199,015 B1   3/2001  Curtwright et al.

(Continued)

FOREIGN PATENT DOCUMENTS

JP    06-201394    7/1994
JP    10221093     8/1998

(Continued)

OTHER PUBLICATIONS

Chinese Office Action issued by the SIPO on Dec. 25, 2009, for Chinese Patent Appln. 200780015268.0.

(Continued)

*Primary Examiner* — Thomas Black
*Assistant Examiner* — Sara Nelson
(74) *Attorney, Agent, or Firm* — Fox Rothschild LLP (57) ABSTRACT

A system for displaying a map, the system including: a map database maintaining map data associated with a route; a map data identification unit identifying map data corresponding to a driving route of a vehicle from the map database; an information receiving unit receiving weather information associated with a current seasonal weather from a background service server in real time; a background data generation unit generating background data according to an actual environment based on the received weather information; and a route guidance unit guiding a route by associating the map data with the generated background data.

7 Claims, 6 Drawing Sheets

(56) References Cited

U.S. PATENT DOCUMENTS

| | | | |
|---|---|---|---|
| 6,611,753 B1 | 8/2003 | Millington | |
| 7,209,148 B2* | 4/2007 | Rasmussen et al. | 345/613 |
| 8,005,613 B2* | 8/2011 | Rasmussen et al. | 701/461 |
| 2003/0174138 A1* | 9/2003 | Shibayama | 345/545 |
| 2004/0066316 A1 | 4/2004 | Ogawa | |
| 2004/0085319 A1* | 5/2004 | Gannon | 345/440 |
| 2005/0274946 A1* | 12/2005 | Yoshida et al. | 257/40 |
| 2006/0118609 A1* | 6/2006 | Iannello | 232/38 |
| 2006/0238538 A1* | 10/2006 | Kapler et al. | 345/440 |
| 2007/0057948 A1* | 3/2007 | Nomura | 345/441 |
| 2007/0176795 A1 | 8/2007 | Matsubara | |
| 2009/0005976 A1 | 1/2009 | Hayashi | |
| 2011/0167343 A1* | 7/2011 | Wright et al. | 715/711 |
| 2011/0229023 A1* | 9/2011 | Jones et al. | 382/162 |
| 2012/0075337 A1* | 3/2012 | Rasmussen et al. | 345/629 |

FOREIGN PATENT DOCUMENTS

| | | | |
|---|---|---|---|
| JP | 10221093 A | * | 8/1998 |
| JP | 10-267668 | | 10/1998 |
| JP | 11-023297 | | 1/1999 |
| JP | 11-160086 | | 6/1999 |
| JP | 2002272983 A | * | 9/2002 |

OTHER PUBLICATIONS

International Search Report for PCT/KR2007/000965 mailed Jun. 13, 2007.

Written Opinion for PCT/KR2007/000965 mailed Jun. 13, 2007.

Tanenbaum, "Structured Computer Organization", 1984, Prentice-Hall, Inc., $2^{nd}$ edition, pp. 10-12.

* cited by examiner

SYSTEM AND METHOD FOR EXPRESSING MAP ACCORDING TO CHANGE SEASON AND TOPOGRAPHY

This application is the U.S. national phase of International Application No. PCT/KR2007/000965 filed 26 Feb. 2007 which designated the U.S. and claims priority to Korean Patent Application No. 10-2006-0038042 filed 27 Apr. 2006, the entire contents of each of which are hereby incorporated by reference.

This application is a continuation of application Ser. No. 12/226,721 filed on Oct. 27, 2008.

TECHNICAL FIELD

The present invention relates to a method and system for displaying a map which may guide a route in a more realistic manner by differently generating background data according to a change of a season and a terrain and associating the background data with map data.

BACKGROUND ART

Navigation systems are systems to provide navigation information for driving of vehicles, such as cars, using satellites. The navigation systems are referred to as automatic navigation systems. Recently, navigation systems provide navigation services, and also a variety of services such as a wireless Internet, video, and call services.

Figure 1:
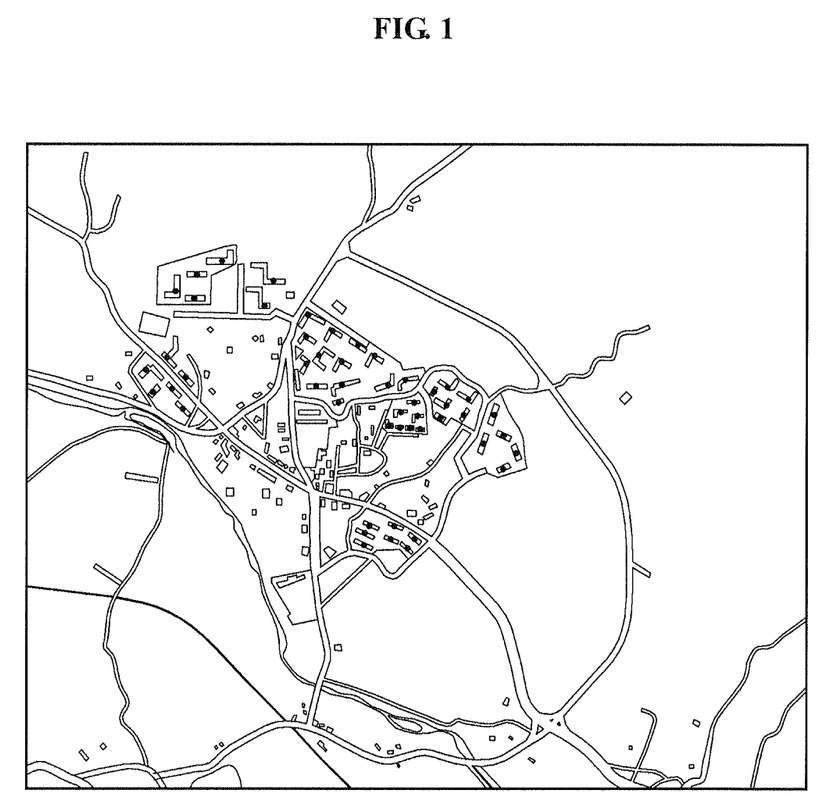
FIG. 1 is a diagram illustrating a navigation screen provided by a navigation system according to a conventional art.

FIG. 1 is a diagram illustrating a navigation screen provided by a navigation system according to a conventional art.

As illustrated in FIG. 1, the navigation system provides map data, i.e. navigation data, which is associated with a route from a starting location to a destination. However, although terrain information such as a farmland, a residential area, a water system, and the like, exist in actual map data, the navigation system in the conventional art does not display the terrain information in the map data. Specifically, the navigation system in the conventional art generates map data, which is mainly focused on route data and point of interest (POI) information, based on a driver's driving. Accordingly, the navigation system in the conventional art does not display the terrain information which is a background of the map data.

For example, a driver driving a vehicle in Seoul focuses on the route data when looking at the map data. However, a great amount of terrain information such as the farmland, the residential area, the water system, and the like, besides the route data exists in map data of a suburb of Seoul. Accordingly, providing a driver driving in the suburb of Seoul with the map data mainly focused on the route data may result in providing the driver with fragmentary information.

Also, in the conventional art, map data according to a weather condition such as raining, snowing, cloudiness, and the like is not provided. Accordingly, the navigation system in the conventional art may not enable the driver to expect and cope with a traffic condition by not providing the driver with weather information via a screen.

DISCLOSURE OF INVENTION

Technical Goals

The present invention provides a method and system for displaying a map which generates background data based on weather information received in real time, background information previously stored for each season, and pattern information and color information previously stored for each season, guides a route by associating the background data with map data which is associated with a driving route of a vehicle, and thereby may provide the map data in a more realistic manner.

The present invention also provides a method and system for displaying a map which classifies background information according to a height of a terrain, stores the classified background information, differently displays map data according to the terrain expressed by the background information, guides a route, and thereby may provide a background environment image as seen through a driver's eyes.

The present invention also provides a method and system for displaying a map which provides weather information such as raining, snowing, cloudiness, and the like, by including the weather information in background data, and thereby may enable a driver to expect and cope with a traffic condition.

The present invention also provides a method and system for displaying a map which guides a route by associating map data, received from a user, from a starting location to a destination with background data similar to a real environment, and thereby may help a driver safely drive a vehicle with a wide field of view.

Technical Solutions

According to an aspect of the present invention, there is provided a system for displaying a map, the system including: a map database maintaining map data associated with a route; a map data identification unit identifying map data corresponding to a driving route of a vehicle from the map database; an information receiving unit receiving weather information associated with a current seasonal weather from a background service server in real time; a background data generation unit generating background data according to an actual environment based on the received weather information; and a route guidance unit guiding a route by associating the map data with the generated background data.

According to another aspect of the present invention, there is provided a system for displaying a map, the system including: a background database maintaining background information for each category, and pattern information and color information for each season according to the category; a user interface unit receiving a starting location and a destination from a user; an information receiving unit receiving date information and weather information from a background service server; an information identification unit identifying background information, and pattern information and color information for each season corresponding to the date information from the background database; a background data generation unit generating background data based on the weather information, the background information, and the pattern information and the color information for each season; and a route guidance unit guiding a route by associating map data from the starting location to the destination, with the generated background data.

According to still another aspect of the present invention, there is provided a method of displaying a map, the method including: maintaining map data associated with a route in a map database; identifying map data corresponding to a driving route of a vehicle from the map database; receiving weather information associated with a current seasonal weather from a background service server in real time; generating background data according to an actual environment based on the received weather information; and guiding a route by associating the map data with the generated background data.

According to yet another aspect of the present invention, there is provided a method of displaying a map, the method including: maintaining background information for each category, and pattern information and color information for each season according to the category in a background database; receiving a starting location and a destination from a user; receiving date information and weather information from a background service server; identifying background information, and pattern information and color information for each season corresponding to the date information from the background database; generating background data based on the weather information, the background information, and the pattern information and the color information for each season; and guiding a route by associating map data from the starting location to the destination, with the generated background data.

BEST MODE FOR CARRYING OUT THE INVENTION

Figure 2:
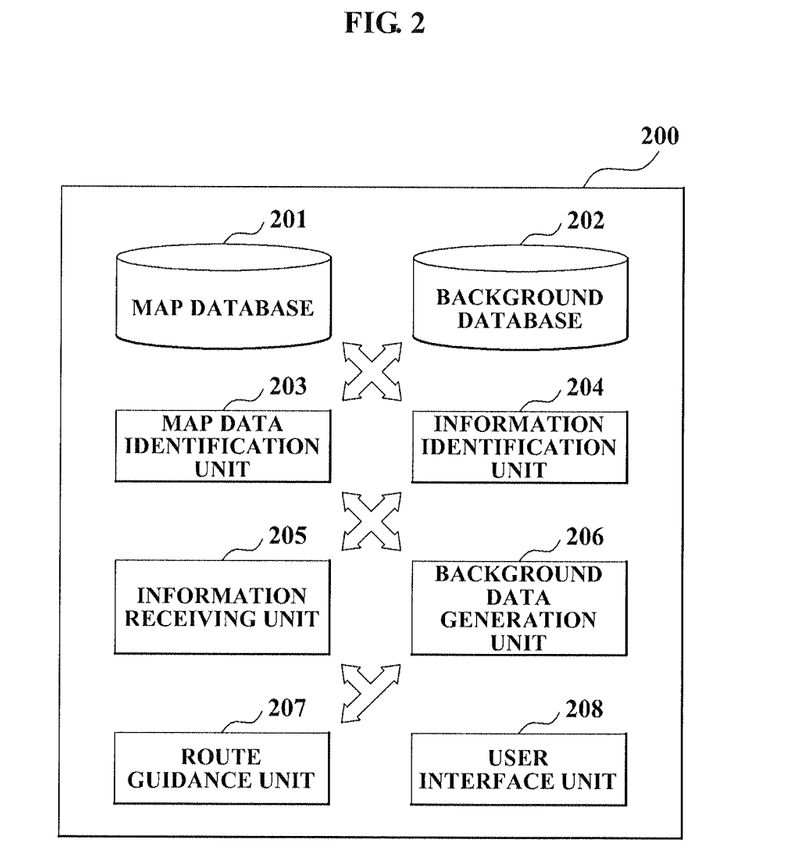
FIG. 2 is a block diagram illustrating a configuration of a system for displaying a map according to an embodiment of the present invention.

FIG. 2 is a block diagram illustrating a configuration of a system for displaying a map according to an embodiment of the present invention.

According to an embodiment of the present invention, the system for displaying a map according to a change of a season and a terrain 200, hereinafter, a map display system 200, includes a map database 201, a map data identification unit 203, an information receiving unit 205, a background data generation unit 206, and a route guidance unit 207. The map database 201 maintains map data associated with a route. The map data identification unit 203 identifies map data corresponding to a driving route of a vehicle from the map database 201. The information receiving unit 205 receives weather information associated with a current seasonal weather from a background service server in real time. The background data generation unit 206 generates background data according to an actual environment based on the received weather information. The route guidance unit 207 guides a route by associating the map data with the generated background data.

The map display system 200 may be used in every system providing a navigation, for example, a navigation system, a location-based service system, and the like.

Also, the map display system 200 further includes a background database 202 and an information identification unit 204. The background database 202 stores a background table and a background color table. The background table includes background information for each category, and the background color table includes pattern information and color information for each season. The information identification unit 204 identifies background information, and pattern information and color information for each season corresponding to current date information from the background database 202 by analyzing the current date information. In this instance, the background data generation unit 206 generates the background data based on the identified background information, the pattern information and the color information for each season, and the weather information.

According to another embodiment of the present invention, the background database 202 classifies the background information according to a height of a terrain and stores the classified background information. Also, the route guidance unit 207 differently displays the map data according to the terrain expressed by the background information.

According to still another embodiment of the present invention, the map display system 200 further includes a user interface unit 208 receiving a starting location and a destination from a user. The route guidance unit 207 guides the route by associating map data from the starting location to the destination with the generated background data.

According to the present invention, the map display system 200 generates the background data based on the weather information received in real time, the background information previously stored for each season, the pattern information and the color information for each season, guides the route by associating the background data with the map data which is associated with the driving route of the vehicle, and thereby may provide the map data in a more realistic manner.

Figure 3:
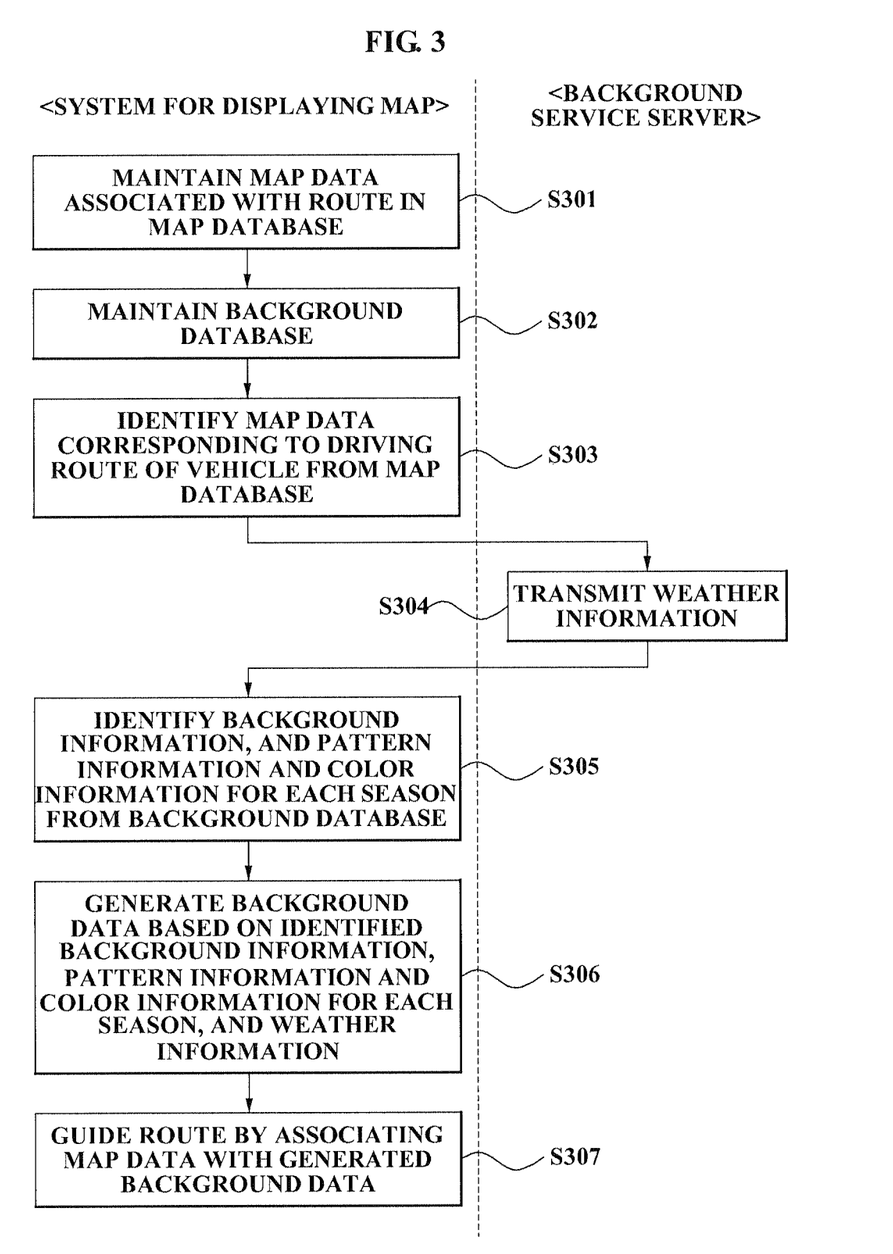
FIG. 3 is a flowchart illustrating a method of displaying a map according to another embodiment of the present invention.

FIG. 3 is a flowchart illustrating a method of displaying a map according to another embodiment of the present invention. The method of displaying a map according to another embodiment of the present invention may be performed in a map display system 200 illustrated in FIG. 2.

In operation S301, a map database 201 of the map display system 200 maintains map data associated with a route. The map data is information required when guiding the route, and may include route information and map information associated with point of interest (POI) information. The map information is in a text, an image, and a video file form. Also, the map display system 200 may store audio information, which is required when guiding the route, by associating with the map data.

In operation S302, a background database 202 of the map display system 200 stores a background table and a background color table. The background table includes background information for each category, and the background color table includes pattern information and color information for each season. According to an embodiment of the present invention, the map display system 200 may maintain the background database 202 by matching background information corresponding to each point of the map data.

Figure 4:
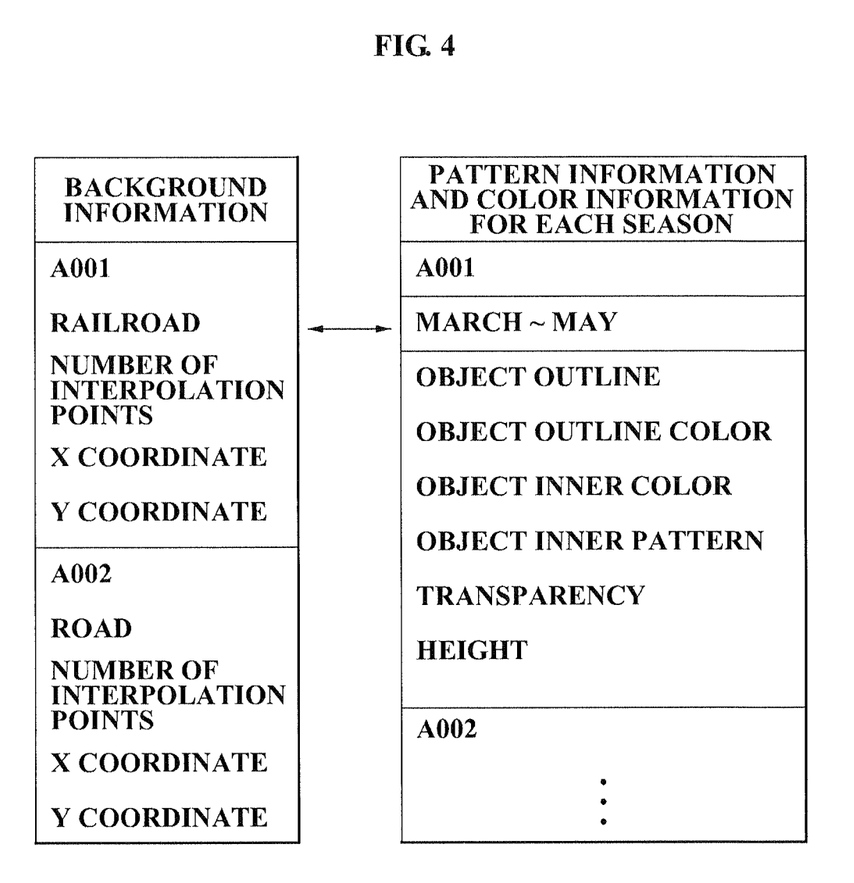
FIG. 4 is a diagram illustrating a configuration of a background database according to an embodiment of the present invention.

FIG. 4 is a diagram illustrating a configuration of a background database according to an embodiment of the present invention.

As illustrated in FIG. 4, the background database 202 maintains a background table and a background color table by matching background identifiers (IDs) with each other.

The background table maintains a background ID, a background type, a number of interpolation points, an x coordinate, and a y coordinate. The background ID is a serial number for identifying each background, and may be represented as 'A001', 'A002' as illustrated in FIG. 4. The background type refers to a background classified for each category. Also, the background type is a text data type and may be classified by categories, for example, a railroad, a road, a building, a golf course, a park, an apartment, a housing complex, a farmland, a forestland including a broadleaf forest and a conifer forest, a contour line, a water system, and the like. The number of interpolation points is a number data type, and a total number of interpolation points configuring an object of the background. The x coordinate and the y coordinate are also the number data type. The x coordinate and the y coordinate are an x coordinate, i.e. latitude, and a y coordinate, i.e. longitude, of a coordinate list configuring the object of the background.

The background color table maintains the background ID, a month and season, an object outline, an object outline color, an object inner color, an object inner pattern, a transparency, and a height. The month and season are a text data type. Also, the month and season are classified with respect to season, for example, March, April, and May for spring, June, July, and August for summer, September, October, and November for fall, and December, January, and February for winter, to vary a background pattern and color for each season. The object outline is an outline type of the object of the background. The object outline color is an outline color of the object of the background. For example, in spring, a solid line may be used as an outline type of the farmland, and a green color may be used as an outline color of the farmland.

Also, the object inner color is a color which fills an inside of the object of the background. The object inner pattern is a pattern which fills the inside of the object of the background. For example, with respect to spring, the object inner color may be represented as the green color, and the object inner pattern may be represented as a rice pattern. Also, the transparency indicates an extent of a transparency, a translucency, and an opacity, and is represented as a value from 1 to 10. The height is a height value corresponding to the object of the background. According to an embodiment of the present invention, map data may be differently displayed using the height for each terrain.

According to the present invention, background information is classified according to the height for each terrain and the classified background information is stored. The map data is differently displayed according to the terrain expressed by the background information, and a route is guided. Accordingly, an environment image as seen through a driver's eyes may be provided in a navigation system.

In operation S303, a map data identification unit 203 of the map display system 200 identifies map data corresponding to a driving route of a vehicle from the map database 201. According to an embodiment of the present invention, the map display system 200 may identify map data corresponding to a driving route when requesting a navigation. Also, as described above, terrain information such as the height of the map data may be identified by referring to the background color table. Accordingly, map data different according to a terrain may be displayed.

In operation S304, a background service server transmits weather information to the map display system 200. The background service server is a server transmitting the weather information in real time, and may maintain a weather database associated with weather. The weather information is current weather information such as snowing, raining, cloudiness, being sunny, and the like. According to an embodiment of the present invention, the background service server may transmit current date information as well as the weather information.

Thus, according to the present invention, the map display system 200 provides the weather information such as raining, snowing, cloudiness, and the like, by including the weather information in background data, and thereby may enable a driver to expect and cope with a traffic condition.

In operation S305, the map display system 200 receives the weather information. Also, in operation S305, the map display system 200 identifies background information, and pattern information and color information for each season corresponding to the current date information from the background database 202 by analyzing the current date information. In a conventional art, as illustrated in FIG. 1, map data which is mainly focused on route data is generated, and thus guiding a route is performed. However, according to the present invention, to guide the route with a more realistic background environment, the background information such as the farmland, the water system, the residential area, and the like, and the pattern information and the color information differently represented for each season are extracted.

According to an embodiment of the present invention, the map display system 200 identifies background information matching each point of previously identified map data from the background table. When an object of the background information for each category is configured, the pattern information and the color information for each season of each background may be identified from the background color table.

In operation S306, a background data generation unit 206 of the map display system 200 generates background data according to an actual environment based on the weather information, the background information, the pattern information and the color information for each season. According to an embodiment of the present invention, the map display system 200 classifies the object of the farmland, the water system, the residential area, and the like, in the previously identified map data, and adds a pattern and a color to the classified object. Accordingly, the map display system 200 generates the background data. Also, the map display system 200 may generate the background data similar to a real environment by further including the weather information such as raining, snowing, cloudiness, and the like in the generated background data.

In operation S307, a route guidance unit 207 of the map display system 200 guides a route by associating the map data with the generated background data. In this instance, as described above, the map data may be differently displayed according to the terrain expressed by the background information. According to an embodiment of the present invention, the route guidance unit 207 may include a display unit and an audio output unit. The background data and text, image, video data associated with the map may be outputted via the display unit. Also, the route may be audio-guided via the audio output unit.

Figure 5:
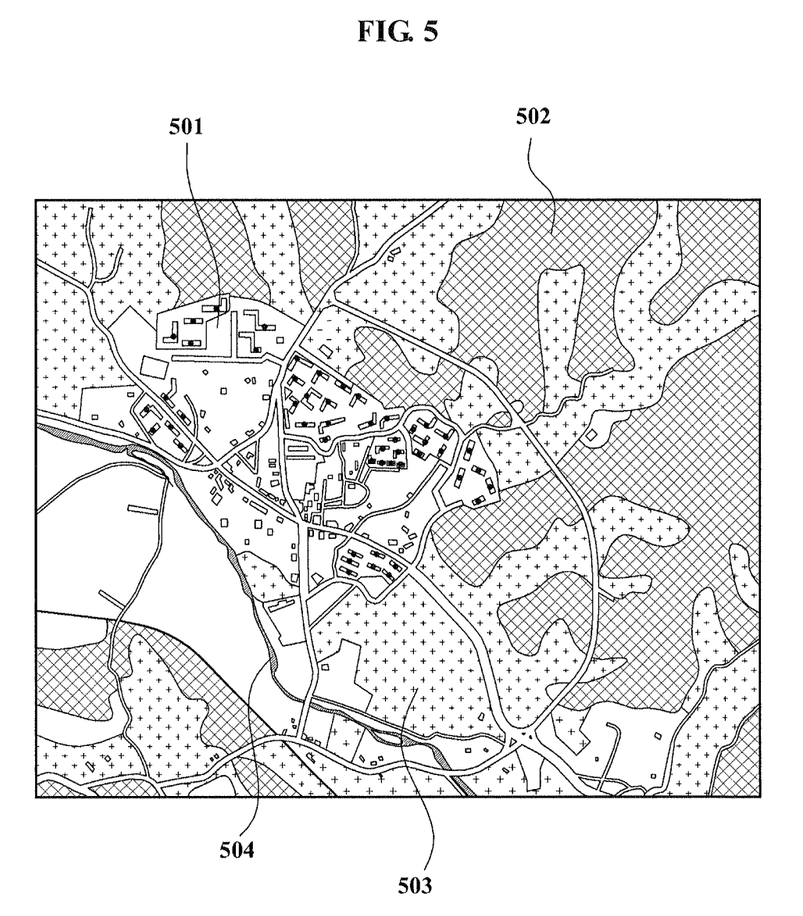
FIG. 5 is a diagram illustrating an example of map data provided by associating with background data according to an embodiment of the present invention.

FIG. 5 is a diagram illustrating an example of map data provided by associating with background data according to an embodiment of the present invention.

As illustrated in FIG. 5, a map display system 200 differently displays the background data according to a farmland 503, a residential area 501, a water system 504, and the like by associating with the map data. Referring to FIG. 1, in a conventional art, map data provides only POI information based on route data. However, in FIG. 5, the residential area 501 is represented in a different background, a different color, and a different pattern. Also, a forestland 502 is represented as an x-pattern, which is represented differently from the residential area 501. The farmland 503 is represented as a rice pattern, which is represented differently from the residential area 501 and the forestland 502. The water system 504 may be represented in a blue color to be represented more graphically.

Although not illustrated, the map display system 200 may differently display the farmland 503 for each season, i.e. using a blue color in spring and summer, a gold color in fall, and a white in winter.

Figure 6:
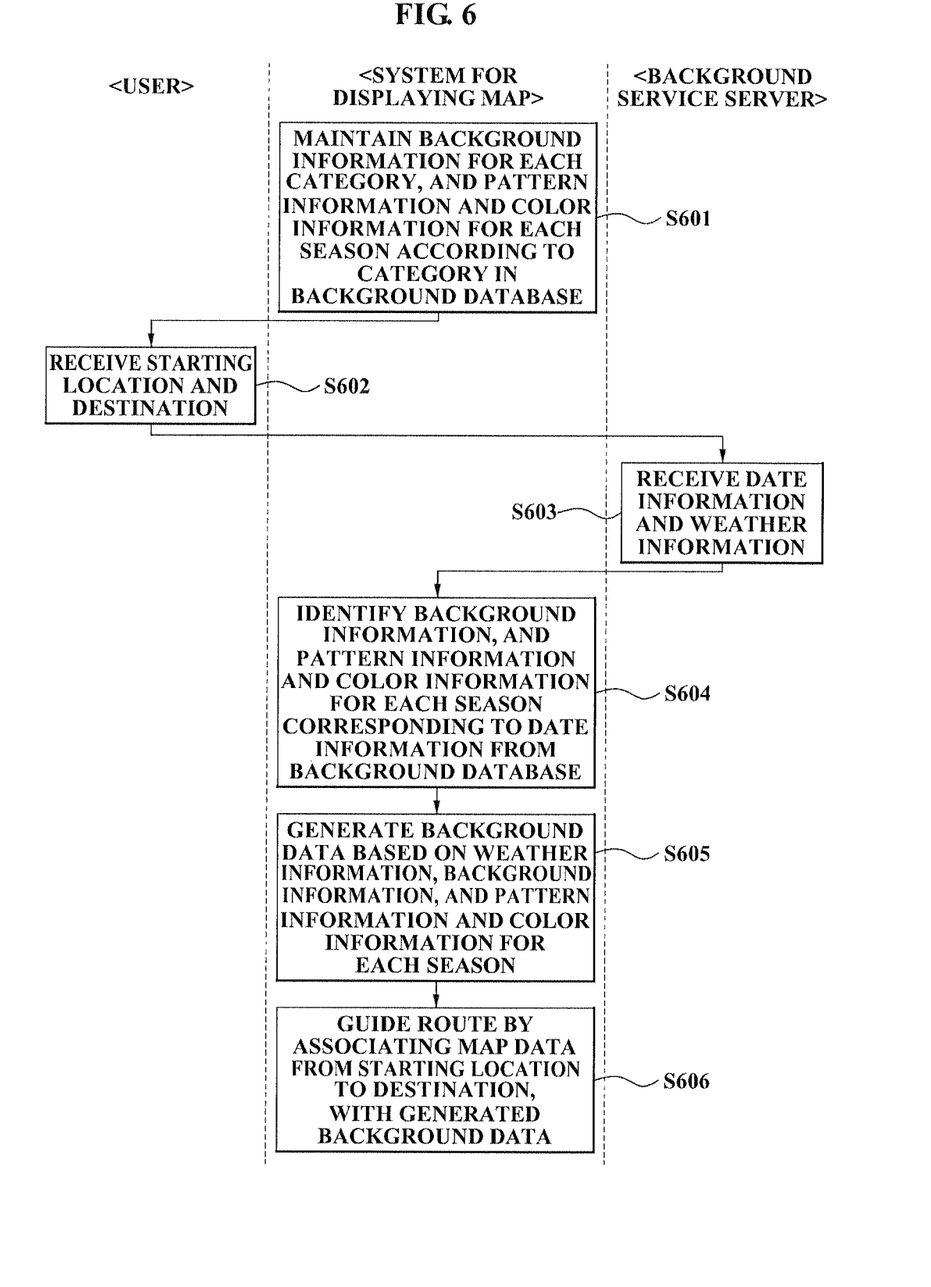
FIG. 6 is a flowchart illustrating a method of displaying a map according to still another embodiment of the present invention.

FIG. 6 is a flowchart illustrating a method of displaying a map according to still another embodiment of the present invention. Unlike FIG. 3, FIG. 6 illustrates a navigation method which receives a starting location and a destination from a user and associates map data from the starting location to the destination with background data.

In operation S601, a map display system 200 maintains background information for each category, and pattern information and color information for each season according to the category in a background database 202. The background database 202 has been described with reference to FIG. 4.

In operation S602, the map display system 200 receives the starting location and the destination from the user. The user may request a route from a current location to the destination by inputting the destination where the user desires to go. Accordingly, the map display system 200 identifies map data from the starting location to the destination from a map database 201.

In operation S603, a background service server transmits date information and weather information to the map display system 200. The date information is information corresponding to a current date. For example, the date information may be represented as 10 a.m., Apr. 19, 2005. The weather information is information such as raining, snowing, cloudiness, and the like, as described above.

In operation S604, the map display system 200 receives the date information and the weather information, and identifies background information, and pattern information and color information for each season corresponding to the date information from a background database 202. Since the pattern information and the color information are classified with respect to season, the pattern information and the color information for each season may be identified by corresponding to current date information.

Operation 605 is identical to operation S306 and operation S606 is identical to operation S307 described with reference to FIG. 3, and thus descriptions with respect to operation S605 and operation S606 are omitted.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the present invention, a method and system for displaying a map generates background data based on weather information received in real time, background information previously stored for each season, pattern information and color information for each season, guides a route by associating the background data with map data which is associated with a driving route of a vehicle, and thereby may provide the map data in a more realistic manner.

Also, according to the present invention, a method and system for displaying a map classifies background information according to a height of a terrain, stores the classified background information, differently displays map data according to the terrain expressed by the background information, guides a route, and thereby may provide a background environment as seen through a driver's eyes.

Also, according to the present invention, a method and system for displaying a map provides weather information such as raining, snowing, cloudiness, and the like, by including the weather information in background data, and thereby may enable a driver to expect and cope with a traffic condition.

Also, according to the present invention, a method and system for displaying a map guides a route by associating map data from a starting location to a destination, received from a user, with background data similar to a real environment, and thereby may help a driver safely drive a vehicle with a wide field of view.

The invention claimed is:

1. A system for displaying a map, the system comprising:
a map database maintaining map data as points of map data;
a map data identification unit identifying map data corresponding to a driving route of a vehicle from the map database;
an information receiving unit receiving weather information associated with a current weather from a background service server in real time;
a background data generation unit generating background data according to an environment based on the received weather information and an object of background information for a plurality of categories, the background information matched to points of the map data;
a route guidance unit guiding a route by associating the map data with the generated background data;
a background database storing a background table and a background color table, the background table including background information for the plurality of categories, and the background color table including pattern information indicating a pattern for each season and the plurality of categories and color information indicating a color for each season and for the plurality of categories; and
an information identification unit identifying background information, and pattern information and color information for each season and the plurality of categories corresponding to current date information from the background database by analyzing the current date information, wherein the background database classifies the background information according to a height of a terrain for the object of the background information for a plurality of categories matched to points of map data and stores the classified background information, and wherein the route guidance unit differently displays the map data according to the height of a terrain for the object of the background information for a plurality of categories matched to points of map data, and guides a route by representing backgrounds according to the indicated pattern information and the indicated color information which are identified by the information identification unit for each object of the background information for a plurality of categories matched to points of map data.

2. The system of claim 1, wherein the background data generation unit generates the background data based on the identified background information, the pattern information and the color information for each season, and the weather information.

3. A system for displaying a map, the system comprising:
a map database maintaining map data as points of map data;
a background database maintaining background information for a plurality of categories, and pattern information and color information for each season according to the plurality of categories, and storing a background table and a background color table, the background table including background information for the plurality of categories, and the background color table including pattern information indicating a pattern for each season and the plurality of categories and color information indicating a color for each season and for the plurality of categories;
a user interface unit receiving a starting location and a destination from a user;
an information receiving unit receiving date information and weather information from a background service server;
an information identification unit identifying background information, and pattern information and color information for each season corresponding to the date information from the background database;
a background data generation unit generating background data based on the weather information, an object of the background information for the plurality of categories, the background information matched to points of map data, and the pattern information and the color information for each season;
a route guidance unit guiding a route by associating map data from the starting location to the destination, with the generated background data, wherein the background database classifies the background information according to a height of a terrain for the object of the background information for a plurality of categories matched to points of map data and stores the classified background information, and wherein the route guidance unit differently displays the map data according to the height of a terrain for the object of the background information for a plurality of categories matched to points of map data, and guides a route by representing backgrounds according to the indicated pattern information and the indicated color information which are identified by the information identification unit for each object of the background information for a plurality of categories matched to points of map data.

4. A method of displaying a map, the method comprising:
maintaining map data as points of map data;
identifying map data corresponding to a driving route of a vehicle from the map database;
receiving weather information associated with a current weather from a background service server in real time;
generating background data according to an environment based on the received weather information and an object of background information for a plurality of categories, the background information matched to points of the map data;
guiding a route by associating the map data with the generated background data;
storing a background table and a background color table, the background table including background information for the plurality of categories, and the background color table including pattern information indicating a pattern for each season and color information indicating a color for each season and for the plurality of categories;
identifying background information, and pattern information and color information for each season corresponding to current date information from the background database by analyzing the current date information; and
guiding a route by representing backgrounds with an indicated pattern and an indicated color which are identified by the information identification unit for each area, wherein the storing classifies the background information according to a height of a terrain for the object of the background information for a plurality of categories matched to points of map data and stores the classified background information, and wherein the guiding differently displays the map data according to the height of a terrain for the object of the background information for a plurality of categories matched to points of map data, and guides a route by representing backgrounds according to the indicated pattern information and the indicated color information which are identified by the information identification unit for each object of the background information for a plurality of categories matched to points of map data.

5. The method of claim 4, wherein the generating generates the background data based on the identified background information, the pattern information and the color information for each season, and the weather information.

6. A non-transitory computer-readable recording medium storing a program for implementing the method according to claim 4.

7. A method of displaying a map, the method comprising:
maintaining map data as points of map data;
maintaining background information for a plurality of categories, and pattern information and color information for each season according to the plurality of categories in a background database, wherein the background database storing a background table and a background color table, the background table including background information for the plurality of categories, and the background color table including pattern information indicating a pattern for each season and the plurality of categories and color information indicating a color for each season and for the plurality of categories;
receiving a starting location and a destination from a user;
receiving date information and weather information from a background service server;

identifying background information, and pattern information and color information for each season corresponding to the date information from the background database;

generating background data based on the weather information, an object of the background information for the plurality of categories, the background information matched to points of map data, and the pattern information and the color information for each season; and guiding a route by associating map data from the starting location to the destination, with the generated background data, wherein the background database storing a background table and a background color table, the background table including background information for the plurality of categories, and the background color table including pattern information indicating a pattern for each season and the plurality of categories and color information indicating a color for each season and for the plurality of categories, and the guiding further includes representing backgrounds with an indicated pattern and an indicated color which are identified by the information identification unit for each area, wherein the maintaining classifies the background information according to a height of a terrain for the object of the background information for a plurality of categories matched to points of map data and stores the classified background information, and wherein the guiding differently displays the map data according to the height of a terrain for the object of the background information for a plurality of categories matched to points of map data, and guides a route by representing backgrounds according to the indicated pattern information and the indicated color information which are identified by the information identification unit for each object of the background information for a plurality of categories matched to points of map data.

* * * * *